United States Patent

Adachi

(10) Patent No.: US 9,389,318 B2
(45) Date of Patent: Jul. 12, 2016

(54) SELF-POSITION MEASURING TERMINAL

(71) Applicants: SONY CORPORATION, Tokyo (JP); SONY MOBILE COMMUNICATIONS, INC., Tokyo (JP)

(72) Inventor: Hiroaki Adachi, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/604,894

(22) Filed: Jan. 26, 2015

(65) Prior Publication Data

US 2015/0142310 A1    May 21, 2015

Related U.S. Application Data

(63) Continuation of application No. 13/761,680, filed on Feb. 7, 2013, now Pat. No. 8,977,493.

(60) Provisional application No. 61/597,204, filed on Feb. 10, 2012.

(51) Int. Cl.
  *G01S 1/00* (2006.01)
  *G01S 19/42* (2010.01)
  *G01S 19/49* (2010.01)
  *G01C 21/00* (2006.01)
  *G01C 21/16* (2006.01)

(52) U.S. Cl.
  CPC .............. *G01S 19/49* (2013.01); *G01C 21/00* (2013.01); *G01C 21/165* (2013.01)

(58) Field of Classification Search
  USPC ..................... 701/469; 342/357.25
  See application file for complete search history.

(56) References Cited

U.S. PATENT DOCUMENTS

| 5,598,166 A | 1/1997 | Ishikawa et al. |
| 6,012,013 A | 1/2000 | McBurney |
| 7,756,527 B2 | 7/2010 | Hashimoto |
| 2007/0032950 A1* | 2/2007 | O'Flanagan ............ G01S 19/47 701/472 |
| 2008/0002031 A1* | 1/2008 | Cana ..................... G01S 5/0027 348/208.14 |

(Continued)

OTHER PUBLICATIONS

Kentaro Mori, et al., "A Study on Self-Position Detection of a Moving Object by an Accerlation Sensor", Okiyama University, 7 pages (with English translation).

*Primary Examiner* — Thomas G Black
*Assistant Examiner* — Tyler Paige
(74) *Attorney, Agent, or Firm* — Oblon, McClelland, Maier & Neustadt, L.L.P.

(57) ABSTRACT

An information processing apparatus including a positioning unit that determines a position of the information processing apparatus based on an external signal; a sensor unit that detects a change in position of the information processing apparatus; and a processing unit that measures, according to a change in position detected at the sensor unit, an amount of displacement of the information processing apparatus from a first time when the positioning unit starts to determine the position of the information processing apparatus to a second time when the positioning unit completes determining the position of the information processing apparatus; and identifies a position of the information processing apparatus at the first time by compensating the position of the information processing apparatus determined by the positioning unit at the second time with the amount of displacement of the information processing apparatus.

17 Claims, 12 Drawing Sheets

(56) References Cited

U.S. PATENT DOCUMENTS

| | | | |
|---|---|---|---|
| 2008/0091350 A1* | 4/2008 | Smith | G01C 21/165 701/472 |
| 2008/0094242 A1 | 4/2008 | Fedora et al. | |
| 2010/0004860 A1* | 1/2010 | Chernoguz | G01C 22/006 701/494 |
| 2010/0312475 A1* | 12/2010 | Cheng | G01S 19/48 701/469 |
| 2010/0332125 A1 | 12/2010 | Tan et al. | |
| 2011/0077891 A1* | 3/2011 | Koenig | G01P 21/00 702/104 |
| 2011/0169690 A1* | 7/2011 | Yule | G01S 5/0036 342/357.25 |
| 2011/0238302 A1* | 9/2011 | Lee | G01C 21/20 701/408 |
| 2012/0053831 A1* | 3/2012 | Halder | G01C 21/165 701/439 |
| 2012/0203490 A1* | 8/2012 | Sayeh | G21K 1/04 702/105 |
| 2012/0215442 A1* | 8/2012 | Sambongi | G01C 21/165 701/472 |
| 2012/0308081 A1* | 12/2012 | Sato | G01S 5/0252 382/103 |
| 2013/0141565 A1 | 6/2013 | Ling | |
| 2013/0147731 A1 | 6/2013 | Adachi | |
| 2013/0211714 A1* | 8/2013 | Adachi | G01C 21/165 701/469 |
| 2014/0073363 A1* | 3/2014 | Tidd | G01S 5/0242 455/456.5 |

\* cited by examiner

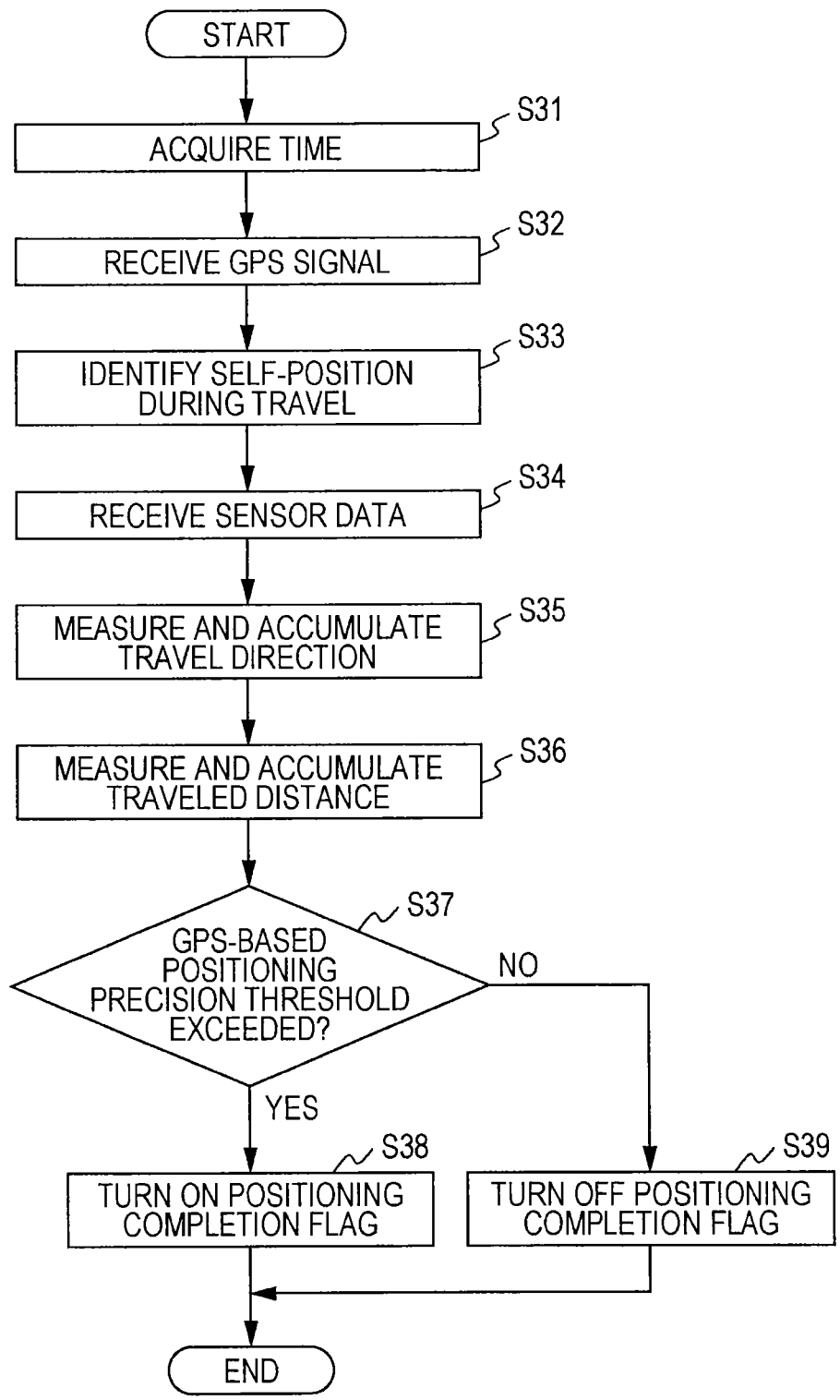

POINT A: POINT AT TIME T1 TO BE IDENTIFIED (POSITIONING IS NOT COMPLETED.)
POINT B: POSITIONING RESULT AT T1 (WITH LOW PRECISION)
POINT Z: POINT AT TIME T2 WHERE POSITIONING PRECISION IS HIGH

US 9,389,318 B2

SELF-POSITION MEASURING TERMINAL

CROSS REFERENCE TO RELATED APPLICATION

This application is a continuation of U.S. Ser. No. 13/761,680, filed Feb. 7, 2013, the entire contents of which is incorporated herein by reference. U.S. Ser. No. 13/761,680 claims the benefit of priority under 119(e) of U.S. Provisional Patent Application Ser. No. 61/597,204 filed on Feb. 10, 2012.

BACKGROUND

Field of the Disclosure

The present disclosure relates to a self-position measuring terminal that is applied to a case in which the Global Positioning System (GPS) is used to determine the position of the terminal itself.

A known conventional technology to measure the position of a terminal itself (referred to below as the self-position) uses GPS. GPS is a positioning system that receives radio waves (GPS signals) from a plurality of GPS satellites and obtains the current self-position (latitude and longitude) of a terminal in which a GPS receiver is incorporated. Accordingly, mobile communication apparatuses (mobile terminals), imaging apparatuses (cameras), and other apparatuses that incorporate a GPS receiver could add information about the latitude and longitude at an imaging site to image data and the like. This type of information, about the latitude and longitude at an imaging site, which is added to the image data and the like, is referred to as a geotag.

When the geotag is read from the image data, the latitude and longitude at the imaging site can be obtained, so it is possible to record the imaging site on an electronic map in correspondence to the latitude and longitude. Accordingly, technologies to improve the precision of positions obtained by the use of GPS have been studied.

U.S. Pub. 2008/0094242 describes a technology in which a terminal receives GPS signals from satellites and also receives signals that improve resolution from geological sensors and acceleration sensors to measure the roll, pitch, and yaw of the terminal and interpolate the position of the terminal.

"A Study on Self-Position Detection of a Moving Object by an Acceleration Sensor", Jan. 22, 2010, Okayama University, describes a technology in which a moving body detects the angles of a roll, pitch, and yaw and accelerations in the three directions of the X, Y and Z axes to detect the position of the moving body.

SUMMARY

Although, as described above, GPS signals can be used to check the self-position of a terminal and record the self-position on captured image data, the following problems have also been known.

(1) First problem: It may take time from when the determination of the self-position is started until the self-position is identified.

(2) Second problem: The precision of the identified self-position may be low (the self-position may be inaccurate). However, the precision of the self-position is improved with time.

Since the above first and second problems depend on the positioning environment (the number of GPS satellites, positional relationship between the self-position and the satellites, presence or absence of an obstacle around the self-position, or the like), some countermeasures are needed.

An example of a positioning process in which a self-position is determined with low precision will be described below with reference to display examples of screens displayed on the display unit (display panel, for example) of a mobile terminal.

FIGS. 12A and 12B illustrate an example of a map and a self-position displayed on the display unit of a mobile terminal. FIG. 12A illustrates a display example at the start of self-position determination, and FIG. 12B illustrates a display example after a lapse of a prescribed time.

As illustrated in FIG. 12A, when the user starts self-position determination at a certain place, a large circle is displayed, indicating that error in positioning precision in the determination of the self-position is 40 meters or less. The "positioning precision" is a circular error probability, which represents a range in which a mobile terminal having a GPS receiver is present with a certain probability. This positioning precision is calculated by the mobile terminal according to the intensity of the GPS signals received, the reception environment, and the like.

The place at which the user is actually present is indicated with a star. This star is a mark not displayed on the display unit. This mark indicates that in reality, the user is outside a building. Even if the user is outside the building, however, an arrow is displayed at the center of a circle and within the building, the arrow indicating that the user is assumed to be present there. The mobile terminal continues to determine the self-position by the use of GPS signals received from GPS satellites, gradually increasing the positioning precision. At that time, the dashed circle in FIG. 12A is displayed so as to become small.

After that, when the positioning precision becomes sufficiently high, for example, when the circular error probability becomes 1 meter or less, the arrow overlaps the small dashed circle, terminating the determination of the self-position. Since the user travels outside buildings on foot from the situation in FIG. 12A to the situation in FIG. 12B, the position of the user at the end of positioning differs from the position at the start of positioning.

Thus, the position determined at the start of positioning often differs from the actually determined position of the user, so there have been many cases in which even when a geotag is added to image data captured by a camera or the like, the imaging site is not indicated accurately.

Accordingly, the inventor has recognized the need to measure the self-position accurately at which GPS-based positioning is started.

According to an embodiment of this disclosure, an information processing apparatus is disclosed that includes a positioning unit that determines a position of the information processing apparatus based on an external signal; a sensor unit that detects a change in position of the information processing apparatus; and a processing unit that measures, according to a change in position detected at the sensor unit, an amount of displacement of the information processing apparatus from a first time when the positioning unit starts to determine the position of the information processing apparatus to a second time when the positioning unit completes determining the position of the information processing apparatus; and identifies a position of the information processing apparatus at the first time by compensating the position of the information processing apparatus determined by the positioning unit at the second time with the amount of displacement of the information processing apparatus.

According to this disclosure, even if an accurate self-position has not been accurately determined at the start of GPS-based positioning, the self-position at the start of positioning can be accurately identified by subtracting a displacement from an accurate self-position determined after a lapse of a certain time.

BRIEF DESCRIPTION OF DRAWINGS

FIG. 7 is a flowchart illustrating a detailed example of processing in step S24 in FIG. 6.

DETAILED DESCRIPTION

Modes that embody this disclosure (referred to below as embodiments) will be described below in the following order.

1. First embodiment (example of processing to identify a self-position at which positioning was started in a case in which it takes time from when positioning was started until the current position is identified)

2. Second embodiment (example of processing to identify the self-position at which positioning was started in a case in which positioning precision at the start of positioning is low)

3. Third embodiment (variation of the method of determining the self-position)

4-1. First to third embodiments (first display example of a user interface)

4-2. First to third embodiments (second display example of the user interface)

4-3. First to third embodiments (third display example of the user interface)

5. Variation

<1. First Embodiment>

[Example of Processing to Identify a Self-Position at which Positioning was Started in a Case in which it Takes Time from when Positioning was Started Until the Current Position is Identified]

A first embodiment of this disclosure will be described with reference to FIGS. 1 to 4. In this embodiment, an example in which the embodiment is applied to a mobile terminal 1 that includes a GPS receiver 3 configured to receive GPS signals and determines the self-position will be described. The mobile terminal 1 implements a self-position determination method, which is carried out cooperatively by internal blocks described later, by having a computer execute a program.

Figure 1:
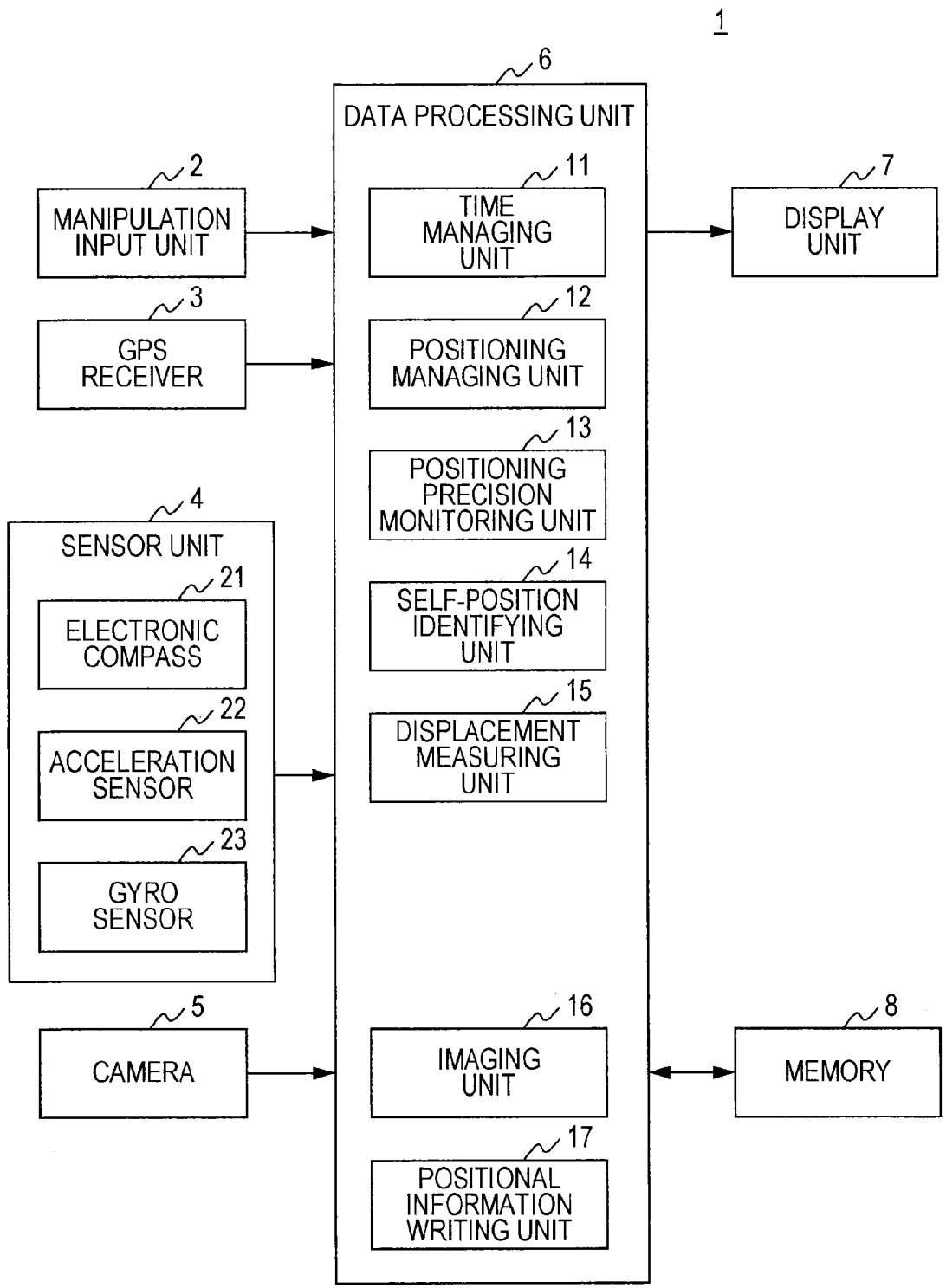
FIG. 1 is a block diagram illustrating an exemplary internal structure of a mobile terminal in a first embodiment of this disclosure.

FIG. 1 is a block diagram illustrating an exemplary internal structure of the mobile terminal 1.

The mobile terminal 1 includes a manipulation input unit 2 to which the user supplies a manipulation input and a GPS receiver 3 that receives GPS signals from GPS satellites. The mobile terminal 1 also includes a sensor unit 4 including various type of sensors as well as a camera 5 that has an optical lens system and an imaging device (not shown) to output image data to a memory 8. The mobile terminal 1 also includes a data processing unit 6 that processes various types of data, a display unit 7, on which a touch panel is placed, that displays still pictures, moving pictures, icons, and other images, and the memory 8 that stores various types of programs, data, and the like.

The data processing unit 6 includes a time managing unit 11, a positioning managing unit 12, a positioning precision monitoring unit 13, a self-position identifying unit 14, a displacement measuring unit 15, an imaging unit 16, and a positional information writing unit 17.

The manipulation input unit 2 is structured with a touch panel and the like. The user can execute various types of functions of the mobile terminal 1 by touching the surface of the touch panel with a finger, a stylus pen, or the like. However, the manipulation input unit 2 may accept user's manipulation inputs through buttons and a dial instead of including the touch panel.

The GPS receiver 3 outputs GPS signals (positioning information) received from a plurality of GPS satellites to the data processing unit 6. The GPS receiver 3 can also appropriately correct a current time according to time information included in the GPS signals.

The sensor unit 4 includes an electronic compass 21 that detects earth's magnetism and thereby detects a direction in which the mobile terminal 1 travels, an acceleration sensor 22 that detects the force of gravity or acceleration and thereby detects the travel speed of the mobile terminal 1, and a gyro sensor 23 that detects an angular velocity and thereby detects the rotational travel of the mobile terminal 1. The travel direction, travel speed, and the amount of rotational travel will be collectively referred to as the mount of change. Upon detection of the amount of change of the terminal 1, the sensor unit 4 outputs the amount of change detected by the sensors to the displacement measuring unit 15 as sensor data.

As an imaging device (not shown) included in the camera 5, charge coupled devices (CCD) imager or a complementary metal oxide semiconductor (CMOS) image sensor is used, for example. The camera 5 captures still pictures or moving pictures; it can drive not only the optical lens system but also a shutter, a diaphragm mechanism, and the like, which are not shown, to photograph a subject appropriately according to the photograph environment of the subject.

The function of each processing block included in the data processing unit 6 is implemented by a software program executed by a central processing unit (CPU) (not shown).

The time managing unit 11 manages time T1 at which the determination of the self-position starts and time T2 at which the determination is terminated.

The positioning managing unit 12 determines the self-position according to GPS signals received from GPS satellites, manages completion or non-completion of positioning as a positioning state, and manages the determined self-position.

The positioning precision monitoring unit 13 monitors the precision in GPS-based positioning, which changes with time, according to positioning error in the self-position determined by the use of GPS signals.

To identify the self-position at which positioning was started, the self-position identifying unit 14 acquires, from the positioning managing unit 12, the self-position at which positioning was started and carries out compensation from the self-position acquired from the positioning managing unit 12 after a lapse of a prescribed time by the use of the amount of displacement. The self-position identifying unit 14 also adds the self-position acquired at the start of GPS-based positioning to an image. The self-position identifying unit 14 also updates the identified self-position at which positioning was started and adds the updated self-position.

The displacement measuring unit 15 measures the amount of displacement, which is used to compensate the self-position at which the positioning managing unit 12 has started positioning, according to the amount of change of the mobile terminal 1, which was read from the sensor data received from the sensor unit 4. At that time, the displacement measuring unit 15 determines a travel direction and a travelled distance relative to the self-position of the mobile terminal 1 at the start of determination. The displacement measuring unit 15 assumes that a travel direction and a traveled distance relative to a certain reference point can be accurately detected with error not exceeding a certain level.

The imaging unit 16 photographs a subject and creates an image including a subject image. At that time, the imaging unit 16 adds processing to image signals received from the camera 5 and controls a shutter operation and the like. In addition, for example, the imaging unit 16 can display an icon for the camera on the display unit 7 and can process image data according to the command entered by manipulating the manipulation input unit 2.

The positional information writing unit 17 writes information about the self-position determined by the positioning managing unit 12 into the memory 8 when the imaging unit 16 carries out a shutter operation.

As the display unit 7, a liquid display panel or an organic electro-luminescence (EL) display panel is used, for example. The display unit 7 may be formed with a main display and a sub-display, which is smaller in size than the main display.

A processing procedure for the mobile terminal 1 according to the first embodiment of this disclosure to identify the self-position at which positioning was started will be briefly described below, the processing procedure being executed when GPS-based positioning has not been completed.

(1) Time T1 at which GPS-based positioning has not been completed but the self-position at which time is to be identified is held.

(2) Sensors are used to constantly determine the mount of change (travel direction and traveled distance), starting from time T1.

(3) The self-position at time T1 is calculated from the self-position at time T2, at which GPS-based positioning has been completed, and the amount of change (travel direction and traveled distance) in the range from time T1 to time T2.

Figure 2:
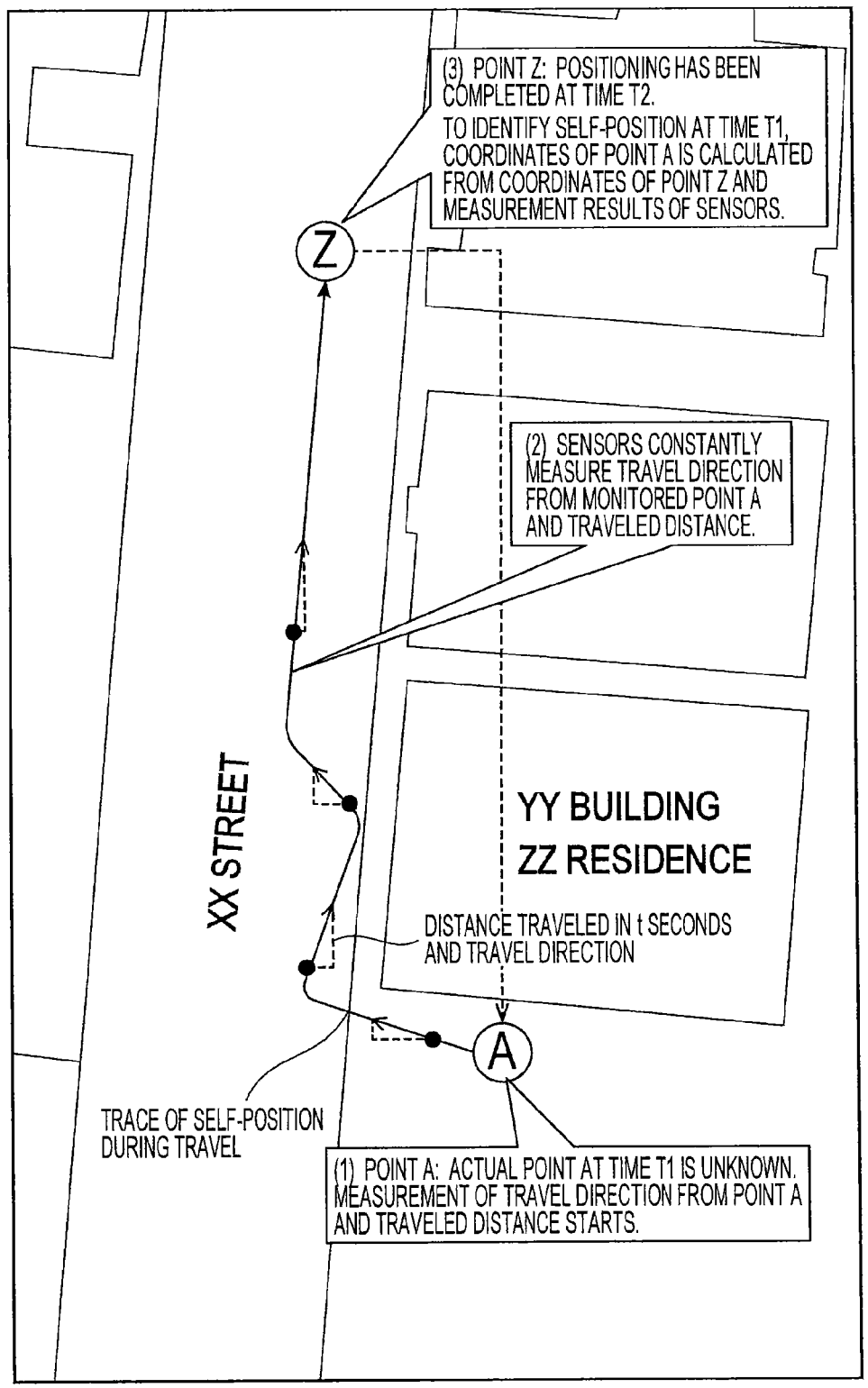
FIG. 2 illustrates an example in which when GPS-based positioning is carried out, a self-position at the start of positioning is identified in the first embodiment of this disclosure.

FIG. 2 illustrates an example in which when GPS-based positioning is carried out, a self-position at the start of positioning is identified.

As illustrated in (1) in FIG. 2, a time at which the determination of the self-position was started by the use of GPS is held. It is assumed here that the user starts positioning at point A indicated at the lower-right in FIG. 2 and the time at which positioning starts is denoted T1.

At this point in time, an accurate position at which the user is actually present having the mobile terminal 1 has not been identified. However, the mobile terminal 1 starts to determine the travel direction and traveled distance of the mobile terminal 1 relative to point A at which positioning was carried out at time T1. The sensor unit 4 constantly determines the travel direction and traveled distance of the mobile terminal 1, starting from time T1, as illustrated in (2) in FIG. 2, and continues to send sensor data to the displacement measuring unit 15. The displacement measuring unit 15 then accumulates the received sensor data in the memory 8.

After that, as illustrated in (3) in FIG. 2, the determination of the self-position is completed at time T2. The self-position identifying unit 14 then carries out compensation by subtracting the amount of displacement continued until positioning by the use of GPS signals has been completed from the self-position at which positioning by the use of GPS signals has been completed. Specifically, to identify an accurate self-position at time T1 from the self-position at point Z at the time (=T2) when GPS-based positioning has been completed, the self-position identifying unit 14 performs an inverse operation on the relative travel direction and traveled distance of the mobile terminal 1, which was determined and accumulated by the displacement measuring unit 15 in the range from time T1 to time T2.

Figure 3:
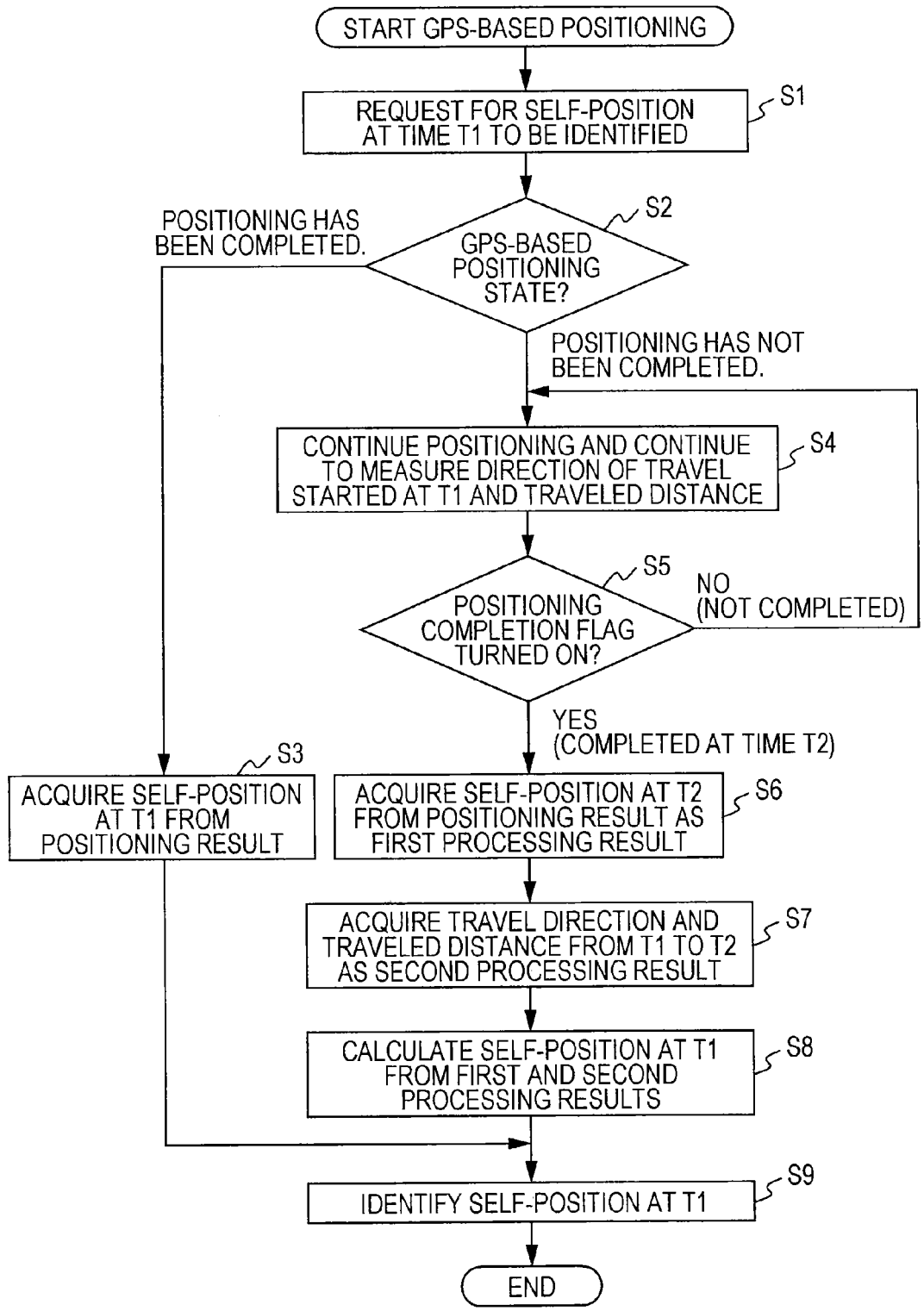
FIG. 3 is a flowchart illustrating an example of processing in which the mobile terminal in the first embodiment of this disclosure identifies its self-position at which positioning was started.

FIG. 3 is a flowchart illustrating an example of processing in which the mobile terminal 1 identifies its self-position at which positioning was started.

First, the positioning managing unit 12 activates the GPS receiver 3 and starts the determination of the self-position by the use of GPS. The self-position identifying unit 14 then requires the positioning managing unit 12 to identify the self-position at time T1 (step S1).

The self-position identifying unit 14 then checks the positioning state at the self-position (step S2). If positioning has been completed, the self-position identifying unit 14 acquires the self-position at time T1 from the positioning managing unit 12 (step S3) and transfers the processing to step S9.

If positioning has not been completed, the positioning managing unit 12 continues the determination of the self-position, and the displacement measuring unit 15 continues to measure the travel direction and traveled distance of the mobile terminal 1, starting from point A at time T1 (step S4). To determine whether the state of GPS-based positioning by the positioning managing unit 12 was updated, the self-position identifying unit 14 then decides whether a positioning completion flag, which indicates whether the GPS-based determination of the self-position has been completed, is turned on or off (step S5).

If the GPS-based positioning state continues to be updated and GPS-based positioning has not been completed, in which case the positioning completion flag is turned off, the processing is returned to step S4 and is repeated. If the GPS-based positioning state has not been updated and GPS-based positioning has been completed, the positioning completion flag is turned on. At that time, at which the current time is T2, the self-position identifying unit 14 acquires the self-position at time T2 from the positioning managing unit 12 as a first processing result (step S6).

Next, the self-position identifying unit 14 acquires, from the displacement measuring unit 15, the travel direction and traveled distance of the mobile terminal 1 in the range from time T1 to time T2 as a second processing result (step S7). The self-position identifying unit 14 then calculates the self-position at point A at time T1 from the acquired first and second processing results (step S8).

The self-position identifying unit 14 then identifies that point A at time T1 is an accurate self-position (step S9), terminating the processing. In step S9, the self-position at time T1 is updated by the following processing. In this processing, point A at which imaging was carried out with the camera 5 is used as a reference point and a position relative to the reference point is acquired.

When the self-position is identified by, for example, using the acceleration sensor 22, the coordinates (X=Zx, Y=Zy) of point Z at which positioning was carried out at time T2 is obtained by GPS, and a distance (X=Tx, Y=Ty) traveled from time T1 to time T2 is obtained from the displacement measuring unit 15. The difference between parameters X and Y is used as the compensated coordinates of point A. That is, the relative position can be obtained as the compensated coordinates (X=Zx−Tx, Y=Zy−Ty) of point A, which is a point at time T1.

Although an example in which the acceleration sensor 22 was used was described, it is also possible to obtain the relative position of the mobile terminal 1 at point A by the use of another sensor. If the electronic compass 21 is used, for example, when the displacement measuring unit 15 accumulates in the memory 8 a direction in which the mobile terminal 1 faces with a lapse of time, a relative direction of the mobile terminal 1 at time T1 can be acquired. If the gyro sensor 23 is used, when the displacement measuring unit 15 accumulates in the memory 8 an angle through which the mobile terminal 1 tilts with a lapse of time, the relative angle of the mobile terminal 1 at time T1 can be obtained.

Figure 4:
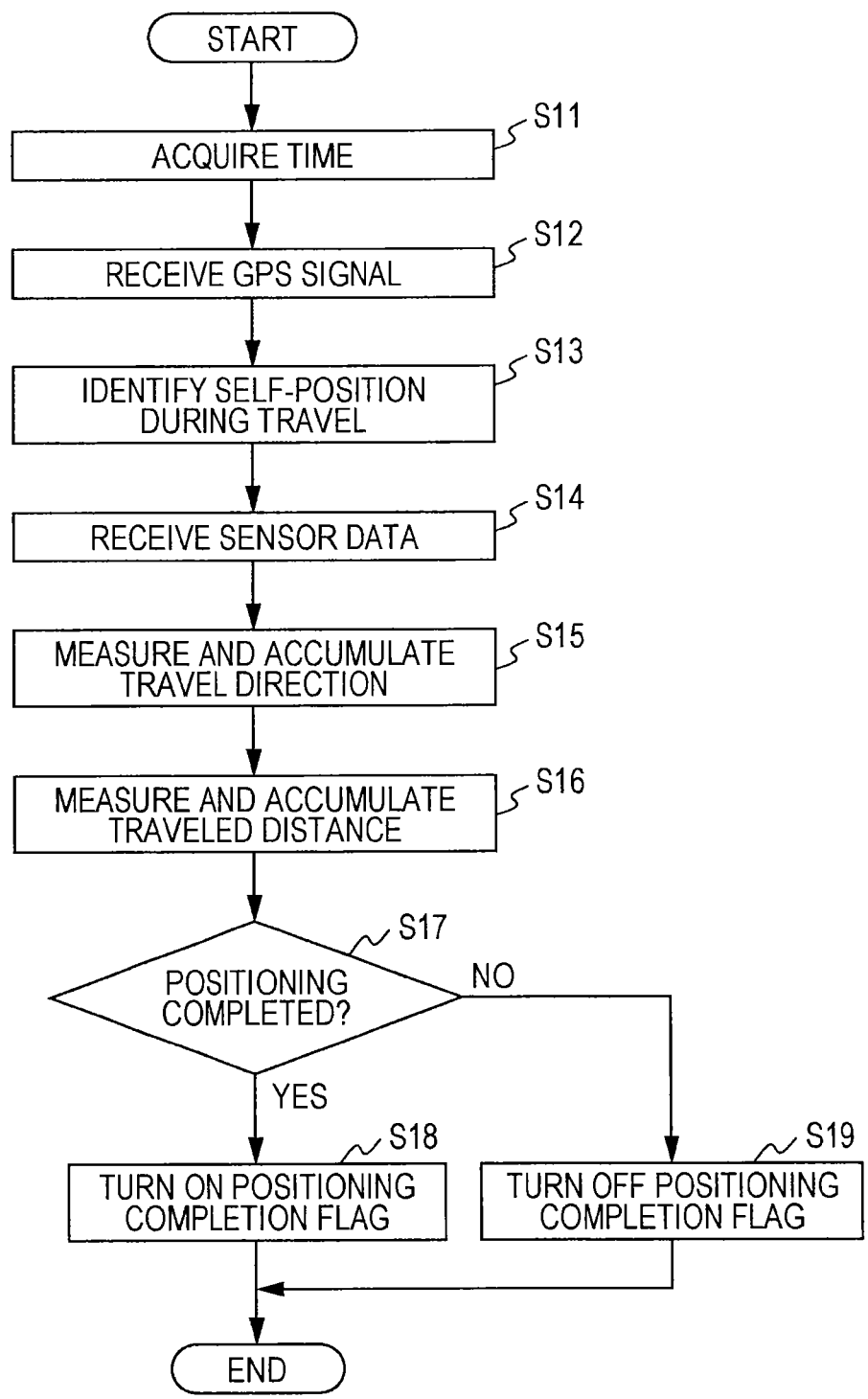
FIG. 4 is a flowchart illustrating a detailed example of processing in step S4 in FIG. 3.

FIG. 4 is a flowchart illustrating a detailed example of processing in step S4 in FIG. 3. First, the positioning managing unit 12 acquires the current time during determination from the time managing unit 11 (step S11), and receives a GPS signal from the GPS receiver 3 (step S12).

Next, the self-position identifying unit 14 identifies the self-position during travel (step S13). The displacement measuring unit 15 then receives sensor data from the sensor unit 4 (step S14). The sensor data includes a travel direction signal output by the electronic compass 21, a travel speed signal output by the acceleration sensor 22, and a rotational travel signal output by the gyro sensor 23.

Next, the displacement measuring unit 15 measures the travel direction of the mobile terminal 1 according to the travel direction signal and accumulates the time-series travel direction in the memory 8 (step S15). The displacement measuring unit 15 also measures the traveled distance of the mobile terminal 1 according to the travel speed signal and accumulates the traveled distance in the memory 8 (step S16).

Next, the positioning managing unit 12 decides whether GPS-based positioning has been completed for the current self-position (step S17). If the determination of the self-position has been completed, the positioning managing unit 12 turns on the positioning completion flag (step S18). If the determination of the self-position has not been completed, the positioning managing unit 12 leaves the positioning completion flag turned off (step S19). The process in step S4 is then completed, and the sequence proceeds to step S5 in FIG. 3.

When the mobile terminal 1 according to the first embodiment described above cannot identify an accurate self-position at time T1 even by the use of GPS, the mobile terminal 1 continues GPS-based positioning for the current self-position. After that, when the mobile terminal 1 can identify an accurate current self-position at time T2, the mobile terminal 1 obtains the self-position at the start of positioning, that is, at time T1, from the current self-position at time T2 and the travel direction and traveled distance detected by the sensor unit 4 in the range from time T1 to time T2. Accordingly, even if an accurate self-position cannot be obtained at the start of positioning, an accurate self-position at which positioning was started can be identified by subsequent positioning.

When the camera is used, in FIG. 2, the mobile terminal 1 writes positional information at point A identified by calculating the position of point A from positional information at point Z at time T2 into the image data of the subject captured at point A at time T1. Then, the user can obtain accurate information about the place at which the user carried out imaging with the camera.

<2. Second Embodiment>

[Example of Processing to Identify the Self-Position at which Positioning was Started in a Case in which Positioning Precision at the Start of Positioning is Low]

Next, the mobile terminal 1 according to the second embodiment will be described with reference to FIGS. 5 and 6. The mobile terminal 1 according to this embodiment uses a threshold in GPS-based positioning; the mobile terminal 1 identifies the self-position at which positioning was started from a determination result obtained when the threshold is exceeded. In the following description that corresponds to FIG. 1 and was described in the first embodiment, like reference numerals are used and detailed descriptions will be omitted.

A processing procedure for the mobile terminal 1 according to the second embodiment of this disclosure to identify the self-position at which positioning was started will be briefly described below, the processing procedure being executed when GPS-based positioning precision is low.

(1) Time T1 at which GPS-based positioning precision is low but the self-position at which time is to be identified is held.

(2) Sensors are used to constantly measure the travel direction and traveled distance, starting from time T1. During this measurement, GPS-based positioning precision is constantly monitored.

(3) The self-position at time T1 is calculated from time T2, at which the GPS-based positioning precision exceeded a fixed threshold, which had been specified in advance, the self-position at time T2, and the travel direction and traveled distance in the range from time T1 to time T2.

Figure 5:
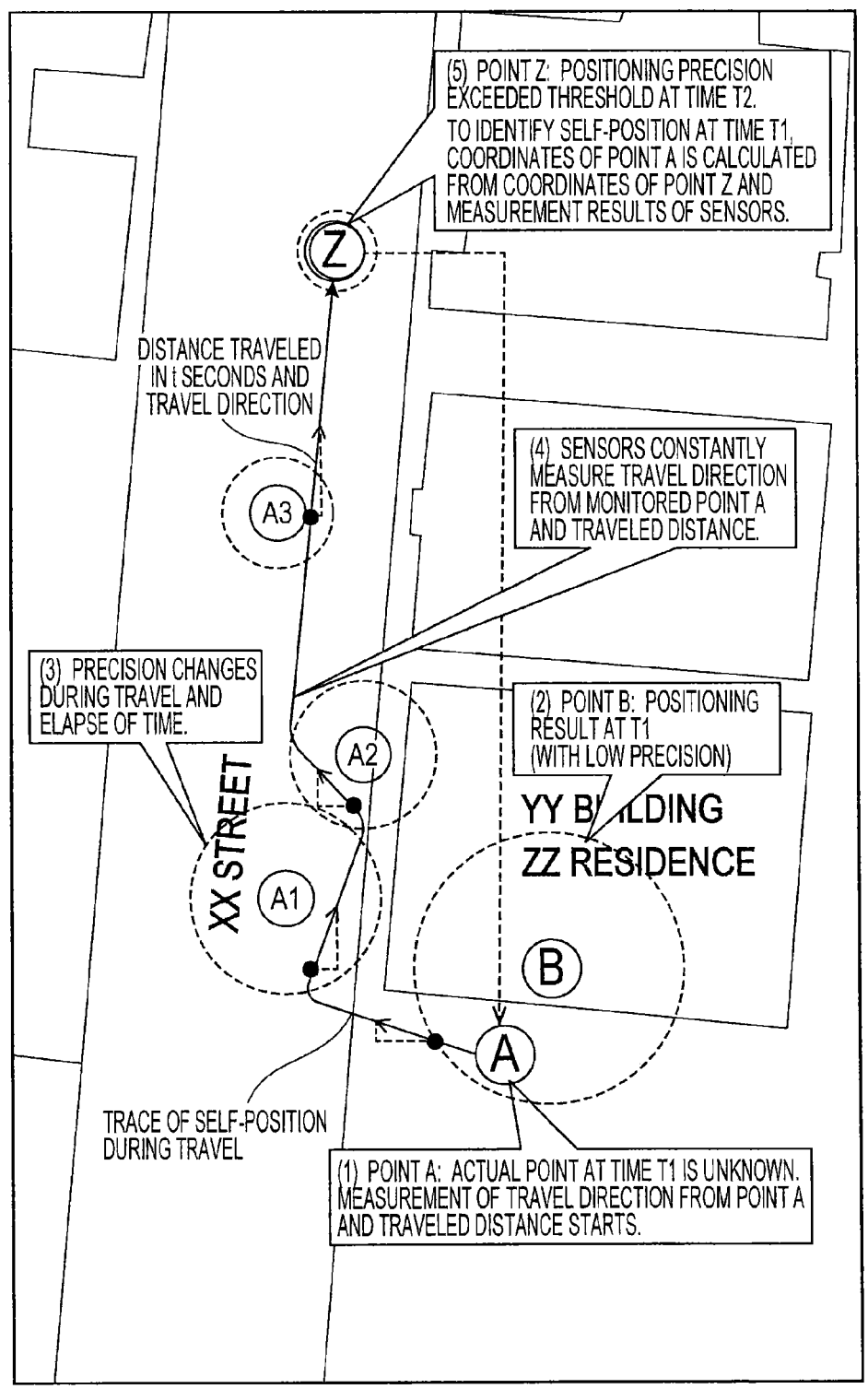
FIG. 5 illustrates an example in which the self-position at the start of positioning is identified when precision in GPS-based positioning in a second embodiment is low.

FIG. 5 illustrates an example in which the self-position at the start of positioning is identified when precision in GPS-based positioning is low.

First, time (=T1) at which GPS-based positioning has not been completed but the self-position at which time is to be identified is held, after which positioning is started ((1) in FIG. 5). It is assumed here that the user starts positioning at point A indicated at the lower-right in FIG. 5 and the time at which positioning starts is denoted T1. At that time, the position at which the user is actually standing is unknown. Since GPS-based positioning precision at the start of positioning is low, the positioning managing unit 12 carries out incorrect positioning, in which case the self-position is identified at point B ((2) in FIG. 5).

However, the mobile terminal 1 starts to measure the travel direction and traveled distance of the mobile terminal 1, with reference to point A. After that, the mobile terminal 1 determines the self-position at points A1, A2, . . . at fixed time intervals. Since the GPS-based positioning precision is increased with a lapse of time, the diameter of the dashed circle, which indicates the GPS-based positioning precision monitored by the positioning precision monitoring unit 13, becomes small ((3) in FIG. 5). At that time, the displacement measuring unit 15 measures the travel direction and traveled distance of the mobile terminal 1, starting from time T1, from sensor data received from the sensor unit 4 ((4) in FIG. 5).

When the positioning precision is then increased and error falls to or below a fixed threshold (1 meter, for example), the diameter of the dashed circle indicating the positioning precision is minimized ((5) in FIG. 5). The positioning time at which the diameter of the dashed circle is minimized is denoted by time T2.

The self-position identifying unit 14 then carries out compensation by subtracting the amount of displacement continued until error in measurement using GPS signals has fallen within a prescribed range from the self-position measured when the positioning precision has fallen within a prescribed range. Specifically, to identify accurate coordinates (latitude and longitude) of the self-position at time T1 from the self-position at point Z at the time (=T2) at which GPS-based positioning has been completed, the self-position identifying unit 14 performs an inverse operation on the relative travel direction and traveled distance of the mobile terminal 1, which was measured and accumulated by the displacement measuring unit 15 in the range from time T1 to time T2.

Figure 6:
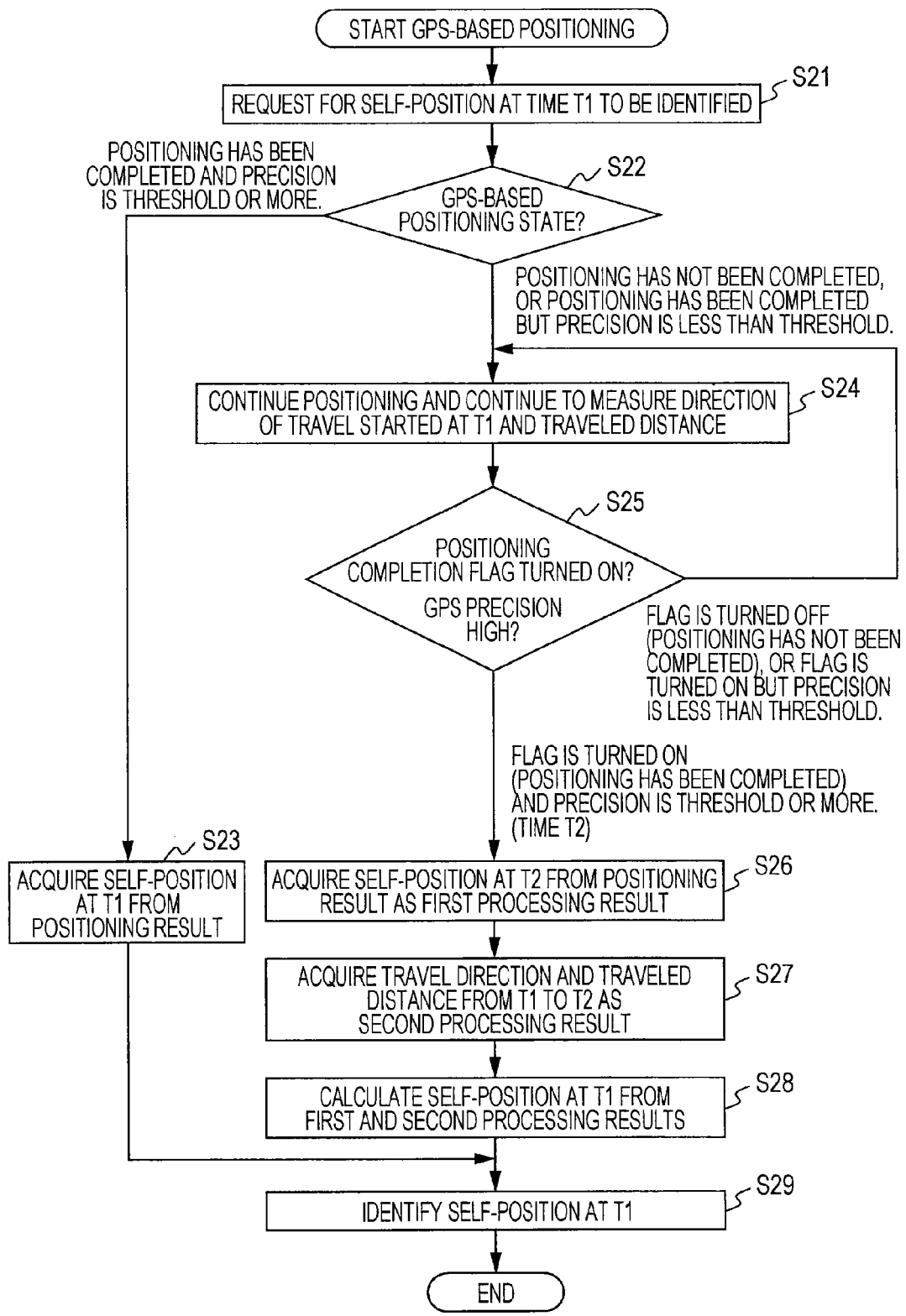
FIG. 6 is a flowchart illustrating an example of processing in which the mobile terminal in the first embodiment of this disclosure identifies its self-position at which positioning was started.

FIG. 6 is a flowchart illustrating an example of processing in which the mobile terminal 1 identifies its self-position at which positioning was started.

First, the positioning managing unit 12 activates the GPS receiver 3 and starts the determination of the self-position by the use of GPS. The positioning managing unit 12 then requires the self-position identifying unit 14 to identify the self-position at time T1 (step S21).

Next, the self-position identifying unit 14 checks the positioning state at the self-position (step S22). If positioning has been completed, the self-position identifying unit 14 acquires the self-position at time T1 from the positioning managing unit 12 (step S23) and transfers the processing to step S29.

If positioning has not been completed, the positioning managing unit 12 continues the determination of the self-position, and the displacement measuring unit 15 continues to measure the travel direction and traveled distance of the mobile terminal 1, starting from point A at time T1 (step S24). The self-position identifying unit 14 then decides whether the positioning completion flag is turned on or off to determine whether the state of GPS-based positioning by the positioning managing unit 12 was updated and also determines GPS-based positioning precision (step S25).

If the positioning completion flag is turned off and thereby the GPS-based positioning has not been completed, the sequence returns to step S24 and the processing is repeated. If the positioning completion flag is turned on and thereby GPS-based positioning has been completed, and GPS precision is superior, the next process is carried out. At that time, the current time is time T2, and the self-position identifying unit 14 acquires, from the positioning managing unit 12, the self-position at time T2 as the first processing result (step S26).

Next, the self-position identifying unit 14 acquires, from the displacement measuring unit 15, the travel direction and traveled distance of the mobile terminal 1 in the range from time T1 to time T2 as a second processing result (step S27).

The self-position identifying unit 14 then calculates the self-position at point A at time T1 from the acquired first and second processing results (step S28).

The self-position identifying unit 14 then identifies that the self-position at time T1 is point A (step S29), terminating the processing.

FIG. 7 is a flowchart illustrating a detailed example of processing in step S24 in FIG. 6. Processing in steps S31 to S36 is the same as in steps S11 to S16 in FIG. 4, so its detailed description will be omitted.

After steps S31 to S36 have been executed, the positioning managing unit 12 decides whether GPS-based positioning precision has exceeded the prescribed threshold (step S37). If GPS-based positioning precision has exceeded the prescribed threshold, the positioning managing unit 12 turns on the positioning completion flag (step S38). If GPS-based positioning precision has not exceeded the prescribed threshold, the positioning managing unit 12 leaves the positioning completion flag turned off (step S39). The process in step S24 in FIG. 7 is then completed, and the sequence proceeds to step S25 in FIG. 6. Thus, it becomes possible to identify the position of point A at which positioning was started from point Z determined when GPS-based positioning precision was sufficiently increased.

When the mobile terminal 1 according to the second embodiment described above cannot identify an accurate self-position at time T1 even by the use of GPS, the mobile terminal 1 continues positioning until the self-position can be identified. After that, when GPS-based positioning precision exceeds the prescribed threshold, the mobile terminal 1 obtains the self-position at time T1 from the current self-position at time T2 and the travel direction and traveled distance detected by the sensor unit 4 in the range from time T1 to time T2. Accordingly, even if an accurate self-position cannot be obtained at the start of positioning due to low GPS precision, an accurate self-position at the start of positioning can be identified with high GPS precision by subsequent positioning.

<3-1. Variation of the Method of Determining the Self-Position>

In the first and second embodiments described above, after the travel direction and traveled distance, measured from time T1, of the mobile terminal 1 are accumulated in the memory 8, the self-position is obtained at time T2. However, an amount of displacement may be obtained at prescribed time intervals before time T2 is reached, that is, even if the positioning completion flag remains turned off. A method of determining the self-position in a third embodiment will be described below.

Figure 8A:
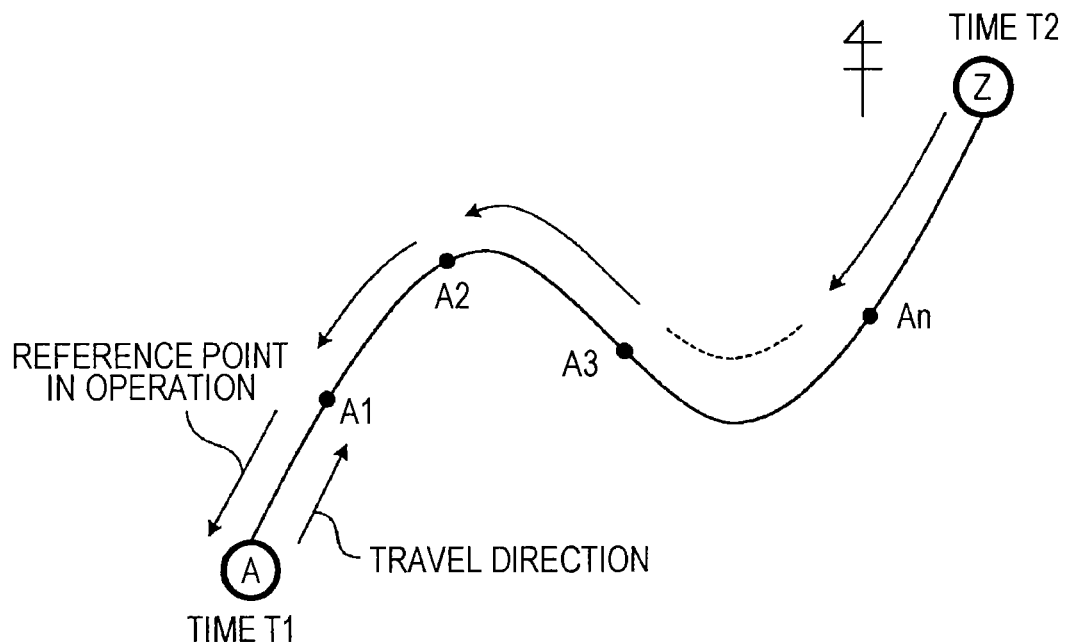
FIGS. 8A and 8B illustrate an example in which the mobile terminal in a third embodiment of this disclosure travels from point A to point Z.
Figure 8B:
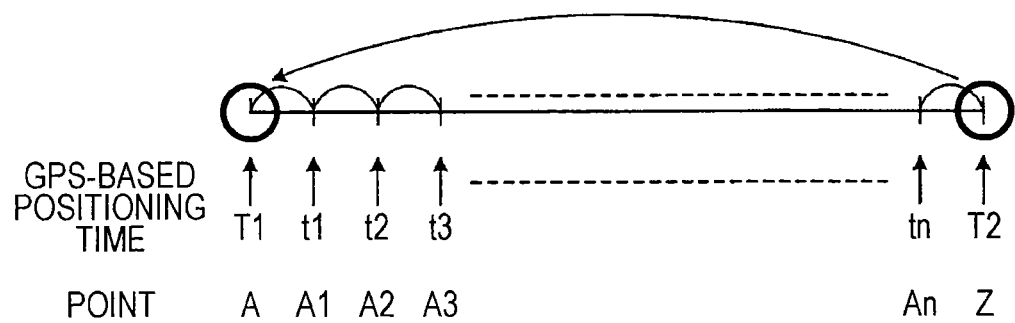

FIGS. 8A and 8B illustrate an example in which the mobile terminal 1 travels from point A to point Z. FIG. 8A illustrates an example of a route along which the mobile terminal 1 travels from point A to point Z, and FIG. 8B illustrates an example of obtaining intermediate points by segmenting the route from point A to point Z in a time-division manner.

Suppose a case in which the user captures an image at point A and travels to point Z while carrying the mobile terminal 1, as illustrated in FIG. 8A. When traveling from point A to point Z, the user passes points A1, A2, . . . , and An. The user determines the self-position at points A1, A2, . . . , and An at fixed time intervals.

After starting the determination of the self-position, the self-position identifying unit 14 repeats a process to accumulate, as an amount of compensation, a difference in an amount of displacement traveled in a predetermined time from a point at which the user was a predetermined time before, and uses the accumulated amount of compensation as the amount of displacement. Specifically, at point A1 (at time t1), the self-position identifying unit 14 obtains compensated coordinates of point A1 from sensor data, acquired from the sensor unit 4, relative to point A. The compensated coordinates can be obtained by the method indicated in step S9 above in FIG. 3.

Next, at point A2, the self-position identifying unit 14 obtains compensated coordinates of point A2 (time t2) from sensor data, acquired from the sensor unit 4, relative to point A1. The self-position identifying unit 14 repeats similar processing to obtain compensated coordinates of point Z from sensor data, acquired from the sensor unit 4, relative to point An (time tn). The self-position identifying unit 14 then identifies point A, which is the self-position at the start of positioning, from the compensated coordinates obtained from time t1 to T2.

FIG. 8B illustrates the route from point A to pint Z as a straight line. At the points to which the user traveled while carrying the mobile terminal 1, compensated coordinates have been obtained at fixed time intervals. If the sensor data acquired from the sensor unit 4 is discarded each time compensated coordinates are obtained at each point, an area in which to record the sensor data can be reduced in the memory 8.

<4-1. First Display Example of a User Interface>

Display examples of a user interface will be described with reference to FIGS. 9A-9D and 10A-10C, the user interface being displayed on the display unit 7 of the mobile terminal 1 in the first to third embodiments described above during the determination of the self-position.

FIG. 9 illustrates a first display example of the user interface displayed on the display unit 7 during the determination of the self-position. FIG. 9A illustrates a display example when GPS-based positioning is disabled. FIG. 9B illustrates a display example when GPS-based positioning is able to determine the self-position. FIG. 9C illustrates a display example when GPS-based positioning enabled to determine the self-position and operation is monitored by the sensor unit 4. FIG. 9D illustrates a display example when the determination of the self-position has been completed.

Figure 9A:
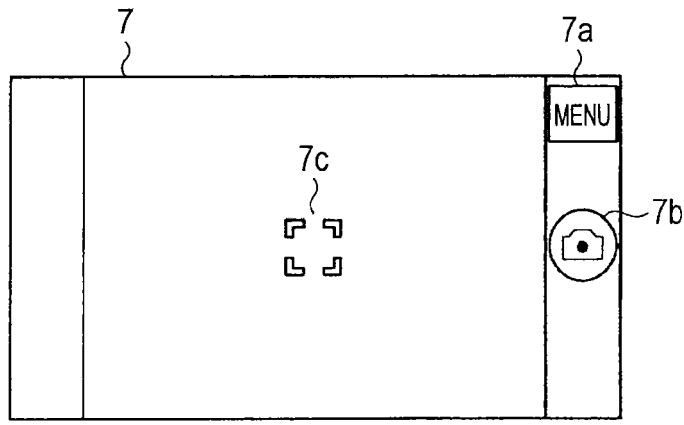
FIGS. 9A-9D illustrate a first display example of a user interface displayed on a display unit during the determination of the self-position in the first to third embodiments of this disclosure.

The positioning managing unit 12 displays, on the display unit 7, an icon indicating that positioning by the use of GPS signals is in progress. With GPS-based positioning turned off, a menu button 7a for displaying various menus, a camera button 7b for switching to a camera function, an AF range frame 7c for measuring a distance to a subject during an auto focus operation are displayed on the display unit 7 (FIG. 9A).

Figure 9B:
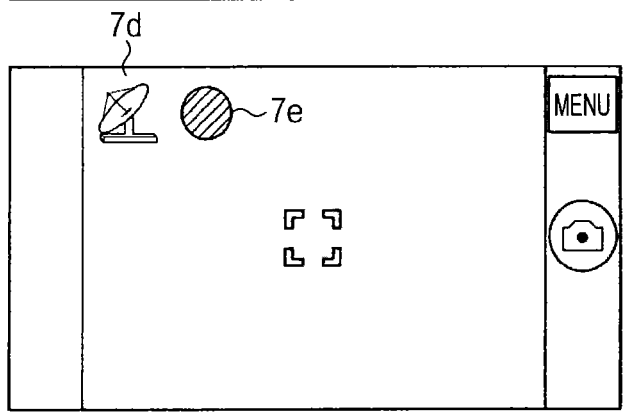

When GPS-based positioning is turned on and the determination of the self-position is started, a GPS icon 7d indicating that GPS signals are being received from GPS satellites and positioning state icon 7e indicating that the self-position is being determined are turned on (FIG. 9B).

Figure 9C:
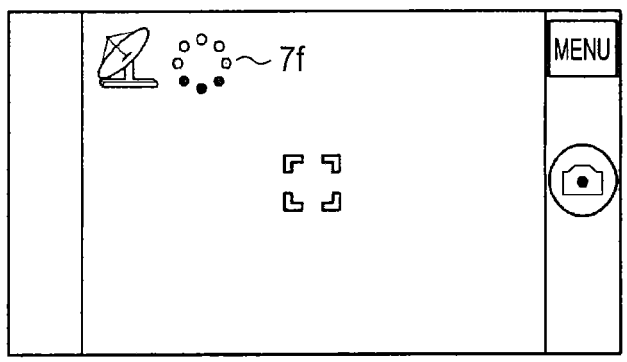
Figure 9D:
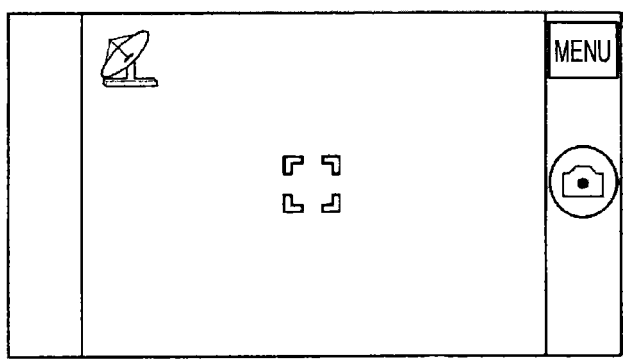

When, in response to a request to determine the self-position, which is the position at time T1, the determination of the self-position is continued and the sensor unit 4 is being activated, a sensor monitoring icon 7f is turned on. (FIG. 9C). When the determination of the self-position is completed at time T2 and the calculation of the self-position at time T1 is completed, the sensor monitoring icon 7f disappears and only the GPS icon 7d remains displayed (FIG. 9D).

<4-2. Second Display Example of the User Interface>

Figure 10A:
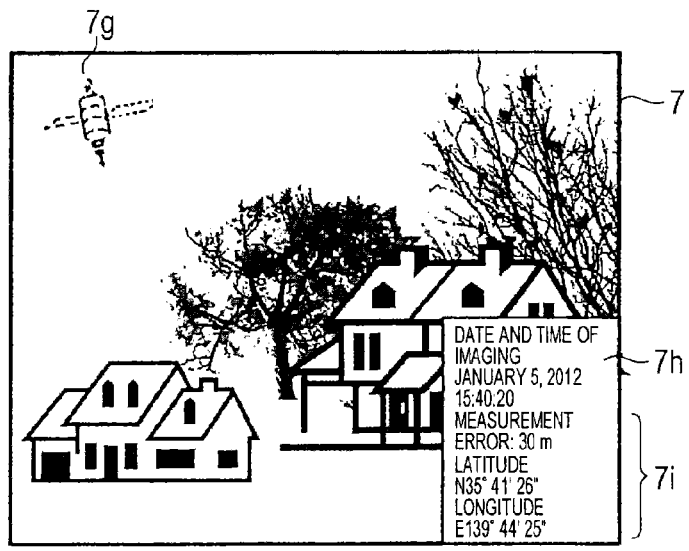
FIGS. 10A-10C illustrate a second display example of the user interface displayed on the display unit during the determination of the self-position in the first to third embodiments at the time of imaging with a captured image displayed.
Figure 10B:
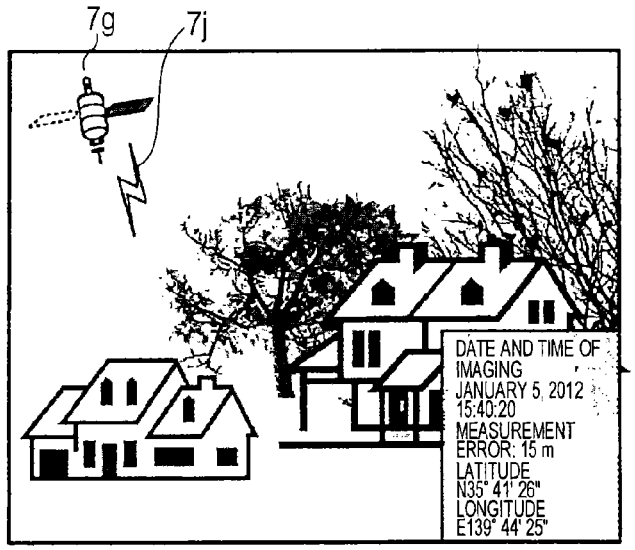
Figure 10C:
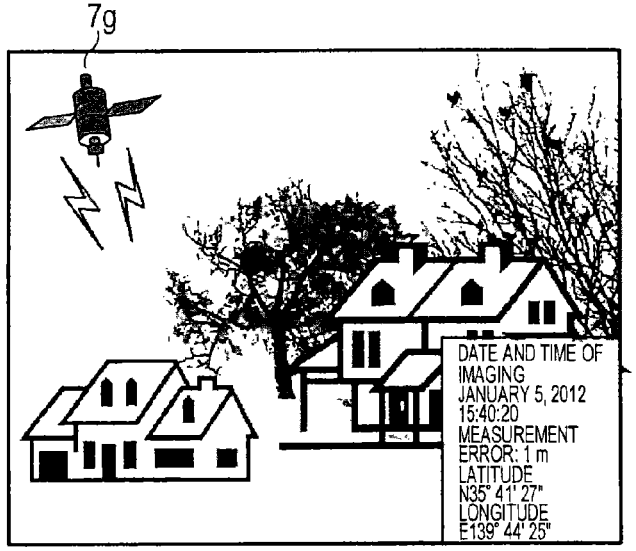

FIGS. 10A-10C illustrate a second display example of the user interface in a case in which the self-position at the time of imaging is determined with a captured image displayed. FIG. 10A illustrates an example of an image displayed on the display unit 7 when imaging is carried out at time T1, FIG. 10B illustrates an example of an image displayed while determination is in progress, and FIG. 10C illustrates an example displayed at time T2 at which determination is completed.

When imaging is carried out, a GPS icon 7g indicating that GPS-based positioning has been started, imaging information 7h added to captured image data, and positioning information 7i, about the self-position, obtained as a result of GPS-based positioning are first displayed on the display unit 7 (FIG. 10A). In this case, the GPS icon 7g is decolorized and is represented with dashed lines. The imaging information 7h includes the date and time of imaging, and the positioning information 7i includes measurement error in GPS-based positioning and the latitude and longitude at the point at which positioning was carried out at time T1. The positioning information 7i indicates that measurement error is 30 meters at time T1, the latitude at the self-position is 35 degrees, 41 minutes, 26 second north latitude, and the longitude is 139 degrees, 44 minutes, 25 seconds east longitude.

When the user then travels with the image displayed, part of the GPS icon 7g is colorized and one radio wave icon 7j, which indicates that GPS-based positioning is in progress, is displayed (FIG. 10B). At that time, it is indicated that measurement error is 15 meters, the latitude at the self-position is 35 degrees, 41 minutes, 26 second north latitude, and the longitude is 139 degrees, 44 minutes, 25 seconds east longitude.

When GPS-based positioning is completed, the entire GPS icon 7g is colorized and the number of radio wave icons 7j is increased to two (FIG. 10C). At that time, it is indicated that measurement error is 1 meter, the latitude at the self-position is 35 degrees, 41 minutes, 27 second north latitude, and the longitude is 139 degrees, 44 minutes, 25 seconds east longitude. Accordingly, an accurate self-position at time T1 is updated and the updated self-position is added to the image data.

<4-3. Second Display Example of the User Interface>

Figure 11:
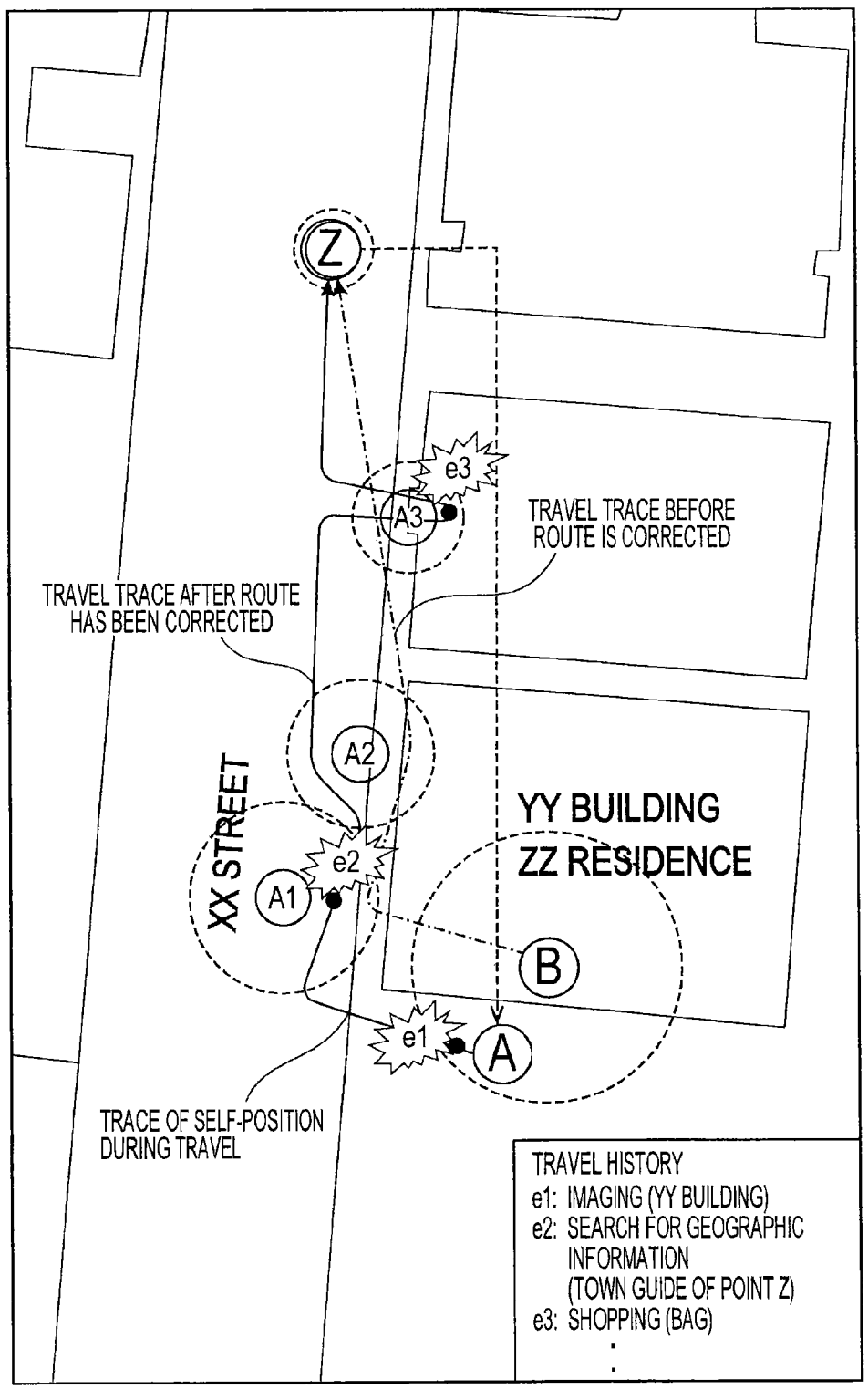
FIG. 11 illustrates a third display example of the user interface used when the travel trace of the mobile terminal is displayed on the display unit.
Figure 12A:
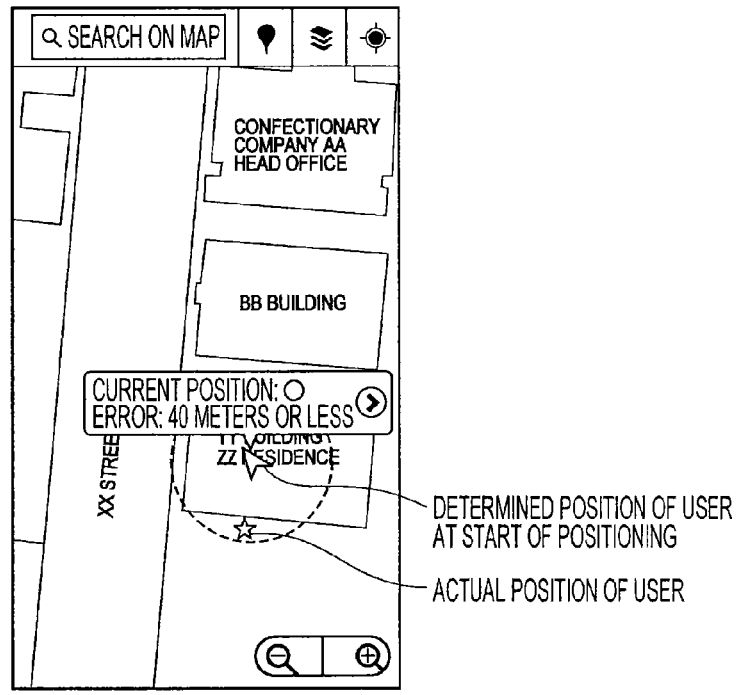
FIGS. 12A and 12B illustrate examples of a map and a self-position displayed on a display unit of a conventional mobile terminal.
Figure 12B:
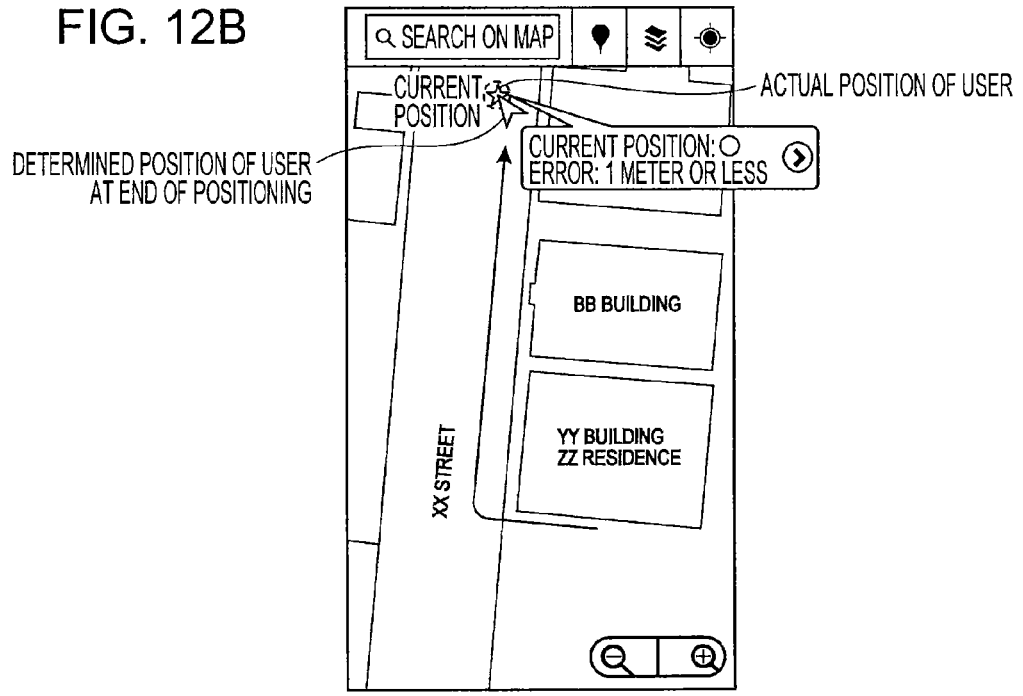

FIG. 11 illustrates a third display example of the user interface used when the travel trace of the mobile terminal 1 is displayed on the display unit 7. In the drawing, since positioning precision is low, a travel trace before the route was compensated is represented with dash-dot lines and a travel trace after the route was compensated is represented with solid lines. The dashed circle indicates GPS-based positioning precision.

When the mobile terminal 1 started the determination of the self-position, the position of point A is not accurate. As indicated in the second embodiment above, when positioning precision is increased after a lapse of the predetermined time, however, the self-position at the start of positioning can be identified. At that time, a trace along which the user carrying the mobile terminal 1 traveled can be obtained from the amount of displacement that the displacement measuring unit 15 has acquired from the sensor unit 4. Accordingly, after the self-position was identified by the self-position identifying unit 14, the displacement measuring unit 15 can display, on the display unit 7, a travel trace between the self-position (point Z) after the travel and the identified self-position (point A) at the start of positioning.

In this case, the identified self-position at the start of positioning and a travel trace to the self-position acquired from the positioning managing unit 12 after a lapse of the predetermined time may be displayed on the display unit 7, and information about an application program used within the prescribed time may also be displayed. Accordingly, when an accurate travel trace is displayed on the display unit 7, behaviors (events) of the user carrying the mobile terminal 1 during travel can also be displayed on the display unit 7 in conformity with the travel trace.

The behaviors of the user include information indicating, for example, that what type of application program the user used and where the user used it and that what the user bought and where the user bought it. These information items are illustrated as events e1, e2, and e3 together with marks indicating the occurrence of the events. For example, event e1 indicates that the user used a camera application to photograph a subject, event e2 indicates that the user used a map application to search for geographic information about the circumference (such as shops recommended through word of mouth), and event e3 indicates that the user entered a shop and used a credit card application of the mobile terminal 1 to do his or her shopping. An event name is displayed at the lower-right of the display unit 7 for each of events e1 to e3. Therefore, the user not only can add positioning information to image data but also can add the user's behaviors at fixed time intervals, starting from the start of photography, to the image data in association with it.

Furthermore, if information that identifies generated events and the mobile terminal 1 is uploaded to an application server, which sends prescribed information to the mobile terminal 1, together with the travel trace of the mobile terminal 1, the application server can analyze the behaviors of the user. Therefore, the application server can send the mobile terminal 1 an application program recommended on the basis of a history of user's behaviors and can cause the mobile terminal 1 to give a display that promotes the use of the application program. Then, it becomes possible to display, on the display unit 7, information customized according to the preference of the user.

The display examples of the user interface illustrated in FIGS. 9 to 11 are used to notify the user of the state of each procedure in each embodiment and to promote the completion of self-position identification, and do not limit the display method.

<5. Variation>

In the process to receive a GPS signal in step S12 in FIG. 4 and step S32 in FIG. 7, there may be a case in which the GPS signal cannot be received when, for example, the user enters a dead space, in which the mobile terminal 1 cannot communicate. Accordingly, a time to acquire GPS information may be a time before the user enters a dead space. The mobile terminal 1 conventionally measures communication intensity at fixed time intervals to change the display of an antenna icon according to the communication intensity. This enables a time to acquire a GPS signal to be set to a time at which the communication intensity of the mobile terminal 1 falls below a prescribed value.

Although the first to third embodiments described above have been applied to the mobile terminal 1 having a camera function as examples, they may be applied to a self-position measuring terminal that obtains a user's travel trace as described in the third display example of the user interface. If a user having this type of self-position measuring terminal activates an application program that records a user's travel trace in the terminal when the user goes jogging, walking, or the like, the user can make use of the recorded trace in user's health management.

Although the conventional geotag has information about a latitude and longitude, a travel in height may be detected according to the displacement information acquired from the sensor unit 4. If, for example, a route that also includes up and down stairways is recorded, more accurate positions to which the user traveled can be obtained.

When the user posts information about the current self-position, a favorite shop, or the like to Social Network Service (SNS), the user may add an identified position. Even in this use application, when the method of identifying the self-position according to this disclosure is used, the user can send an accurate position to SNS even at a position apart from the identified position. By comparison, in the conventional practice, the user must wait until the position is identified.

When a series of processes in the embodiments described above is executed by software, the series of processes can be executed by a computer in which programs constituting the software have been embedded in dedicated hardware or by a computer in which programs executing various functions have been installed. For example, the series of processes can be executed by installing programs constituting desired software in, for example, a general-purpose personal computer.

A recording medium storing program code of software that implements the functions in the embodiments described above may be supplied to a system or an apparatus. It will be appreciated that the functions can also be executed when a computer (or a CPU or another control unit) in the system or apparatus reads out and executes the program code stored in the storage medium.

In this case, a flexible disk, hard disk, optical disk, magneto-optical disk, CD-ROM, CD-R, magnetic tape, non-volatile memory card, or ROM can be used, for example, as the recording medium used to supply the program code.

When the computer reads outs and executes the program code, the functions in the embodiments described above are implemented. In addition, an OS or the like running on the computer executes part or all of the actual processes in response to instructions from the program code. A case in which the functions in the embodiments described above are executed by this processing is also included. The processes in the embodiments described above may be formed with hardware instead of executing them with software.

It will be apparent that this disclosure is not limited to the embodiments described above and other various types of application examples and variations are possible without departing from the intended scope of this disclosure described in the claims. Accordingly, it will be understood by those skilled in the art that various modification and combinations and other elements may be derived from design or other elements within the range of the claims or an equivalent range of the claims.

This enclosure can also have structures as described below.

(1) An information processing apparatus comprising: a positioning unit that determines a position of the information processing apparatus based on an external signal; a sensor unit that detects a change in position of the information processing apparatus; and a processing unit that measures, according to a change in position detected at the sensor unit, an amount of displacement of the information processing apparatus from a first time when the positioning unit starts to determine the position of the information processing apparatus to a second time when the positioning unit completes determining the position of the information processing apparatus; and identifies a position of the information processing apparatus at the first time by compensating the position of the information processing apparatus determined by the positioning unit at the second time with the amount of displacement of the information processing apparatus.

(2) The information processing apparatus of (1), wherein the processing unit identifies the position of the information processing apparatus at the first time by subtracting the measured amount of displacement from the position of the information processing apparatus determined by the positioning unit at the second time.

(3) The information processing apparatus of any of (1) to (2), wherein the sensor unit comprises at least one of an electronic compass, an acceleration sensor and a gyro sensor.

(4) The information processing apparatus of any of (1) to (3), wherein the sensor unit continuously detects the change in position of the information processing apparatus between the first time and the second time.

(5) The information processing apparatus of any of (1) to (4), wherein the positioning unit is a Global Positioning Satellite (GPS) unit that determines the position of the information processing apparatus based on externally received GPS signals.

(6) The information processing apparatus of (5), wherein the processing unit is further configured to monitor a precision in the position determined by the GPS unit.

(7) The information processing apparatus of (6), wherein the processing unit determines that the positioning unit completes determining the position of the information processing apparatus when the precision in the position determined by the GPS unit is within a predetermined range.

(8) The information processing apparatus of any of (1) to (7), further comprising: a display, wherein the processing unit controls the display to display a graphic indicia indicating that the positioning unit is actively determining a position of the information processing apparatus.

(9) The information processing apparatus of (8), wherein the graphic indicia includes an image of a satellite.

(10) The information processing apparatus of any of (8) to (9), wherein the processing unit controls the display to modify the graphic indicia when the positioning unit completes determining the position of the information processing apparatus.

(11) The information processing apparatus of any of (8) to (10), wherein the processing unit controls the display to display a second graphic indicia indicating that the position of the information processing apparatus at the first time is in the process of being identified.

(12) The information processing apparatus of (11), wherein the processing unit controls the display to modify the second graphic indicia when the position of the information processing apparatus at the first position has been identified.

(13) The information processing apparatus of any of (1) to (12), further comprising: a display, wherein the processing unit controls the display to display the position of the information processing apparatus determined by the positioning unit at the second time.

(14) The information processing apparatus of any of (1) to (13), further comprising: a display, wherein the processing unit controls the display to display the position of the information processing apparatus identified at the first time.

(15) The information processing apparatus of any of (1) to (14), further comprising: an image capturing unit that captures an image of a subject, wherein the processing unit adds information corresponding to the position of the information processing apparatus identified at the first time to the captured image.

(16) The information processing apparatus of any of (1) to (15), further comprising: an image capturing unit that captures an image of subject; and a display, wherein the processing unit controls the display to display the position of the information processing apparatus determined by the positioning unit at the second time or the position of the information processing apparatus identified at the first time superimposed on the captured image of the subject.

(17) The information processing apparatus of any of (1) to (16), further comprising: a display, wherein the processing unit controls the display to display a trace linking the position of the information processing apparatus identified at the first time with the position of the information processing apparatus determined by the positioning unit at the second time.

(18) A method performed by an information processing apparatus, the method comprising: determining, by a position determining unit of the information processing apparatus, a position of the information processing apparatus based on an external signal; detecting, by a detecting unit of the information processing apparatus, a change in position of the information processing apparatus; measuring, according to a change in position detected by the detecting, an amount of displacement of the information processing apparatus from a first time when the positioning unit starts to determine the position of the information processing apparatus to a second time when the positioning unit completes determining the position of the information processing apparatus; and identifying a position of the information processing apparatus at the first time by compensating the position of the information processing apparatus determined by the positioning unit at the second time with the amount of displacement of the information processing apparatus.

(19) A non-transitory computer-readable medium including computer-program instructions, which when executed by an information processing apparatus, cause the information processing apparatus to perform a process comprising: determining, by a position determining unit of the information processing apparatus, a position of the information processing apparatus based on an external signal; detecting, by a detecting unit of the information processing apparatus, a change in position of the information processing apparatus; measuring, according to a change in position detected by the detecting, an amount of displacement of the information processing apparatus from a first time when the positioning unit starts to determine the position of the information processing apparatus to a second time when the positioning unit completes determining the position of the information processing apparatus; and identifying a position of the information processing apparatus at the first time by compensating the position of the information processing apparatus determined by the positioning unit at the second time with the amount of displacement of the information processing apparatus.

The invention claimed is:
1. An information processing apparatus comprising:
positioning circuitry configured to determine a position of the information processing apparatus based on an external signal;
a sensor unit configured to detect a change in position of the information processing apparatus, wherein the sensor unit comprises at least one of an electronic compass, an acceleration sensor and a gyro sensor; and
processing circuitry configured to
determine whether the positioning circuitry has completed determining the position of the information processing apparatus based on the external signal;
measure, according to a change in position detected at the sensor unit, an amount of displacement of the information processing apparatus from a first time when it is determined that the positioning circuitry has not yet completed determining the position of the information processing apparatus to a second time when it is determined that the positioning circuitry has completed determining the position of the information processing apparatus; and identify a position of the information processing apparatus at the first time by compensating the position of the information processing apparatus determined by the positioning circuitry at the second time with the amount of displacement of the information processing apparatus.

2. The information processing apparatus of claim 1, wherein
the processing circuitry is configured to identify the position of the information processing apparatus at the first time by subtracting the measured amount of displacement from the position of the information processing apparatus determined by the positioning circuitry at the second time.

3. The information processing apparatus of claim 1, wherein
the sensor unit continuously detects the change in position of the information processing apparatus between the first time and the second time.

4. The information processing apparatus of claim 1, wherein
the positioning circuitry is Global Positioning Satellite (GPS) circuitry configured to determine the position of the information processing apparatus based on externally received GPS signals.

5. The information processing apparatus of claim 4, wherein
the processing circuitry is further configured to monitor a precision in the position determined by the GPS circuitry.

6. The information processing apparatus of claim 5, wherein
the processing circuitry is configured to determine that the positioning circuitry completes determining the position of the information processing apparatus when the precision in the position determined by the GPS circuitry is within a predetermined range.

7. The information processing apparatus of claim 1, further comprising:
a display, wherein
the processing circuitry is configured to control the display to display a graphic indicia indicating that the positioning circuitry is actively determining a position of the information processing apparatus.

8. The information processing apparatus of claim 7, wherein
the graphic indicia includes an image of a satellite.

9. The information processing apparatus of claim 7, wherein
the processing circuitry is configured to control the display to modify the graphic indicia when the positioning circuitry completes determining the position of the information processing apparatus.

10. The information processing apparatus of claim 7, wherein
the processing circuitry is configured to control the display to display a second graphic indicia indicating that the position of the information processing apparatus at the first time is in the process of being identified.

11. The information processing apparatus of claim 10, wherein
the processing circuitry is configured to control the display to modify the second graphic indicia when the position of the information processing apparatus at the first position has been identified.

12. The information processing apparatus of claim 1, further comprising:
a display, wherein
the processing circuitry is configured to control the display to display the position of the information processing apparatus determined by the positioning circuitry at the second time.

13. The information processing apparatus of claim 1, further comprising:
a display, wherein
the processing circuitry is configured to control the display to display the position of the information processing apparatus identified at the first time.

14. The information processing apparatus of claim 1, further comprising:
a display, wherein
the processing circuitry is configured to control the display to display the position of the information processing apparatus determined by the positioning circuitry at the second time or the position of the information processing apparatus identified at the first time superimposed on the captured image of the subject.

15. The information processing apparatus of claim 1, further comprising:
a display, wherein
the processing circuitry is configured to control the display to display a trace linking the position of the information processing apparatus identified at the first time with the position of the information processing apparatus determined by the positioning circuitry at the second time.

16. A method performed by an information processing apparatus, the method comprising:
determining, by processing circuitry, whether the positioning circuitry has completed determining a position of the information processing apparatus based on an external signal;
detecting, by a sensor unit of the information processing apparatus, a change in position of the information processing apparatus, wherein the sensor unit comprises at least one of an electronic compass, an acceleration sensor and a gyro sensor;
measuring, according to a change in position detected by the detecting, an amount of displacement of the information processing apparatus from a first time when it is determined that the positioning circuitry has not yet completed determining the position of the information processing apparatus to a second time when it is determined that the positioning circuitry has completed determining the position of the information processing apparatus; and
identifying a position of the information processing apparatus at the first time by compensating the position of the information processing apparatus determined by the positioning circuitry at the second time with the amount of displacement of the information processing apparatus.

17. A non-transitory computer-readable medium including computer-program instructions, which when executed by an information processing apparatus, cause the information processing apparatus to:
determine whether positioning circuitry of the information processing apparatus has completed determining a position of the information processing apparatus based on an external signal;
detect a change in position of the information processing apparatus by at least one of an electronic compass, an acceleration sensor and a gyro sensor;

measure, according to a change in position detected by the detecting, an amount of displacement of the information processing apparatus from a first time when it is determined that the positioning circuitry has not yet completed determining the position of the information processing apparatus to a second time when it is determined that the positioning circuitry has completed determining the position of the information processing apparatus; and identify a position of the information processing apparatus at the first time by compensating the position of the information processing apparatus determined by the positioning circuitry at the second time with the amount of displacement of the information processing apparatus.

* * * * *